(12) United States Patent
Jilkén (10) Patent No.: US 10,465,352 B2
(45) Date of Patent: Nov. 5, 2019

(54) MODULAR PIER AND ATTACHMENT SYSTEM FOR MODULAR PIER

(71) Applicant: Leif Jilkén, Kalmar (SE)

(72) Inventor: Leif Jilkén, Kalmar (SE)

( * ) Notice: Subject to any disclaimer, the term of this patent is extended or adjusted under 35 U.S.C. 154(b) by 0 days.

(21) Appl. No.: 15/928,125

(22) Filed: Mar. 22, 2018

(65) Prior Publication Data

US 2019/0292740 A1    Sep. 26, 2019

(30) Foreign Application Priority Data

Mar. 23, 2017   (SE) ...................................... 1750349

(51) Int. Cl.
```
F16B 5/06      (2006.01)
E02B 3/06      (2006.01)
F16B 5/00      (2006.01)
E04B 5/02      (2006.01)
```
(52) U.S. Cl.
CPC .............. E02B 3/068 (2013.01); E04B 5/023 (2013.01); F16B 5/002 (2013.01)

(58) Field of Classification Search
CPC ... E01D 19/125; E01D 2101/40; E04B 1/003; E04B 2005/237; E04B 5/023; E04B 5/12; E04B 5/02; E02B 3/068; F16B 2200/40; F16B 5/002; E04F 15/04; E04F 2201/05; E04F 2201/0505; E04F 2015/02083

USPC ............................. 405/218; 52/650.3, 585.1
See application file for complete search history.

(56) References Cited

U.S. PATENT DOCUMENTS

| | | | |
|---|---|---|---|
| 4,940,021 A * | 7/1990 | Rytand | E02B 3/064 114/263 |
| 5,412,915 A | 5/1995 | Johnson | |
| 6,128,880 A | 10/2000 | Meenan, Jr. | |
| 2004/0237463 A1 * | 12/2004 | Reif | E04F 13/0844 52/782.1 |
| 2004/0250505 A1 | 12/2004 | Leek et al. | |

* cited by examiner

*Primary Examiner* — Carib A Oquendo
(74) *Attorney, Agent, or Firm* — Gabriela B. Tomescu, Esq.; Bergenstråhle & Partners AB (57) ABSTRACT

The invention relates to a pier (10), a pier attachment system (1), a method for building the pier (10). The pier attachment system (1) is used for attaching a surface module (2) of the pier to a lower part (6) of the pier. The pier attachment system (1) comprises an attachment bracket (3), an attachment plug (4), and a surface module (2). The attachment plug (4) is adapted to extend between an aperture (21a) in a first surface module (2a) and an aperture (21b) in a second surface module (2b). The attachment bracket (3) is adapted to fasten the attachment plug (4) to a beam (5) of the lower part (6) of the pier and thereby fasten the surface modules (2) to the lower part of the pier (6).

14 Claims, 7 Drawing Sheets

Fig. 8b

MODULAR PIER AND ATTACHMENT SYSTEM FOR MODULAR PIER

This application claims priority to Swedish Patent Application No. SE 1750349-1, filed 23 Mar. 2017, the entire contents of which are hereby incorporated by reference.

TECHNICAL FIELD

The present invention relates generally to a pier, an attachment system for attaching a surface module to a pier, and a method for building a pier.

BACKGROUND ART

In prior art, piers are traditionally built from wood or stones. The structures are fragile to storms, high-tide, and ice. The construction of piers has not changed substantially over time, the foundation, or the lower part of the pier, is commonly built by old telephone posts, rocks, stone, or concreate pipes. The surface material is commonly tared or pressure impregnated wood.

Although piers have not changed much over time the constructions varies between different locations. The construction method at a specific location often correspond to the force of nature in that specific location. For example, the ocean normally presents a more difficult environment for a pier than a small fresh water lake, hence are the piers more rigid in the ocean. However, most piers independent of location and construction methodology are frequently refurbished or mended after storms, high-tide, or ice that has affected the structure. It is common that the material is destroyed after for example wooden planks are forced from their position on the pier by a storm. It is thereby common practice for most pier owners to occasionally replace damaged wooden planks, battens, or deals with new material.

Impregnated wood and tared wood as commonly used in the art is not good for the environment. Both impregnated wood and tared wood requires recycling to avoid toxic gases and substances to be released into nature. Therefore, it would be beneficial to provide a solution that addresses at least some of the aforementioned drawbacks.

SUMMARY OF INVENTION

Storms often give rise to high waves. High-tide is common during some seasons and during the winter ice is a common problem for pier owners. All of those factors devastates piers by detaching the surface materials by force and/or blowing the surface material up on dry land. This often has the effect that the surface material is damaged and can't be reused, instead new material must be added to the pier.

An object of the present invention is to create a pier comprising an attachment system which reduces the expenses of replacement parts when repairing a pier after for example a storm. Furthermore, the pier and its attachment system shall be easy to assemble both initially and when the pier is repaired.

The object is met by an attachment system according to claim 1, and a pier according to claim 12 and a method for building a pier according to claim 14. The attachment system is arranged for attaching at least one surface module to a lower part of a pier. The lower part of the pier can be any form of foundation of the pier, such as a beam or a concrete structure. The attachment system comprises an attachment bracket, an attachment plug, and a surface module. The attachment plug is adapted to extend between an aperture in a first surface module and an aperture in a second surface module. The attachment bracket is adapted to fasten the attachment plug to a beam of the lower part of the pier and thereby fasten the surface modules to the lower part of the pier.

The attachment plug is in one embodiment made of wood and is adapted to be the weakest link in the attachment system. The attachment plug is thereby the first part of the pier to break during for example a storm.

The attachment bracket is adapted to be folded around the attachment plug and be attached to the beam of the lower part of the pier. The attachment bracket has at least one sharp edge in abutment with the attachment plug. The sharp edge is adapted to facilitate a breakage line in the attachment plug.

The surface modules are in one embodiment elongated self-supporting surface modules produced from a composite material.

The self-supporting surface modules are in one embodiment constituted of at least a first and second material, the first and second material being different materials having equal or substantially equal coefficients of elasticity.

According to one embodiment of the attachment system for attaching surface modules of a pier to a lower part of the pier, the attachment system comprises an attachment bracket, an attachment plug, a first surface module, and a second surface module. The attachment plug is adapted to extend between an aperture in the first surface module and an aperture in the second surface module. The attachment bracket is adapted to be fastened to the lower part of the pier and the attachment bracket is to be fastened to the attachment plug so that the attachment plug is fastened to the lower part of the pier. Thereby, the first and the second surface modules are fastened to the lower part of the pier.

It is one advantage with the present solution that the attachment plug is held down to the lower part of the pier via an attachment bracket. Thereby, the surface modules are only secured by the attachment plugs.

It is thereby one advantage that, if the attachment plugs break, the surface modules are released from the pier without any damage occurring to the surface modules. The damaged is focused to the attachment plug which is easy to replace.

According to on embodiment the attachment plug is made of wood.

According to one embodiment the attachment plug is made of a composite material.

According to one embodiment of the attachment system the attachment plug is weaker than the attachment bracket and the first and second surface module.

It is one advantage with the present solution that the attachment plug is adapted to be the weakest link in the attachment system. Due to that the attachment plug is weaker than the attachment bracket and the first and second surface module, the attachment plug is the first part to brake if the load from for example a storm is increased on the pier. This signifies that when the attachment system is exposed to an external force, the attachment plug breaks more easily than the attachment bracket and the first and the second surface module. The attachment plug is also the cheapest component in the attachment system and is easy to replace.

According to one embodiment of the attachment system the attachment bracket has a first loop-shaped end in which the attachment plug is adapted to be inserted and a second end adapted to be attached to the lower part of the pier.

According to one embodiment the attachment bracket is adapted to be folded around the attachment plug and be attached to a beam of the lower part of the pier or a beam constituting the lower part of the pier.

According to one embodiment the attachment bracket has at least one sharp edge in abutment with the attachment plug, wherein said sharp edge is adapted to facilitate a breakage line in the attachment plug.

According to one embodiment the first and the second surface modules are elongated self-supporting surface module produced from a composite material.

It is one advantage with the present solution that the surface modules in one embodiment are self-supporting surface modules. Self-supporting as used herein means that the surface modules can support at least their own weight when not arranged on a pier.

According to one embodiment each of the first and the second self-supporting surface modules is constituted of at least a first and second material, the first and second material being different materials having equal or substantially equal coefficients of elasticity.

The first and second material can for example be wood and a polymer or any other similar materials.

According to one embodiment the lower part of the pier is at least one beam.

According to one embodiment the at least one beam has a hat channel profile.

According to one embodiment the attachment bracket is a bendable metal strip that is adapted to be fastened to the at least one beam of the lower part of the pier.

According to one embodiment the attachment plug has a specific length corresponding to more than twice of the width of a first internal cavity in said surface modules.

According to one aspect a pier comprises an attachment system as described herein.

According to one embodiment the pier further comprise at least one vertical surface module arranged at a first side of the first and the second surface modules.

The vertical surface module is arranged substantially perpendicular to the first and second surface modules, and all surface modules constituting a walking surface of the pier.

According to one aspect of building a pier comprising an attachment system as described herein, the pier is built by:
arranging the first surface module on the lower part,
inserting the attachment plug in an aperture of said first surface module on a side of the first surface module that is to face the second surface module,
fastening said attachment plug with an attachment bracket to the lower part of the pier,
or inserting said attachment plug into the attachment bracket, which attachment bracket is fastened to the lower part of the pier,
arranging a second surface module on the lower part, and
inserting said attachment plug into an aperture of the second surface module facing the aperture of the first surface module.

The attachment plug is inserted with a first end in the first surface module and its second end in the second surface module.

According to one embodiment the pier is further built by:
placing at least one attachment plug in a side aperture of said first or second surface module, wherein the side apertures are arranged on a side of the first or second surface module facing an end of the pier, and
arranging a vertical surface module on the side of the first or second module by engaging said at least one attachment plug to an aperture in said vertical surface module.

The pier is built with the attachment system for attaching a surface material to a pier, wherein the attachment system comprises an attachment bracket and an attachment plug. The method for attaching surface material to the pier comprises the steps:
arranging a first surface module on a beam of a pier structure,
placing an attachment plug in an aperture of said first surface module on a surface facing the direction wherein a second surface module is to be arranged,
fastening said attachment plug with an attachment bracket to the beam of the pier structure,
arranging a second surface module on the beam of the pier structure, and
sliding the second surface module into engagement between the attachment plug and an aperture of the second surface module corresponding to the aperture of the first surface module,
placing at least one attachment plug in an aperture of said first or second surface module on a surface facing an end of the pier, and
arranging a vertical surface module on a side of said pier engaging said at least one attachment plug to an aperture in said vertical surface module.

In one embodiment the vertical surface modules comprises internal cavities and the internal cavities are used to transport and heat water, the internal cavities in the surface modules can thereby work as solar collectors.

It is one advantage with the present solution that the surface modules can be hollow having channels that can be used to transport water. Water that is transported in the surface modules can further be heated by the sun.

In one embodiment the vertical surface modules comprises internal cavities and the internal cavities are used as channels for electric cables.

In one embodiment the surface modules has at least one channel and the attachment plug has a length corresponding to more than twice of a width of the at least one channel.

According to one embodiment a wire is attached between two or more surface modules.

It is one advantage that when surface modules are released from the pier a wire holds them together enabling that fewer items must be located by the pier owner.

BRIEF DESCRIPTION OF DRAWINGS

The invention is now described, by way of example, with reference to the accompanying drawings, in which.

DESCRIPTION OF EMBODIMENTS

In the following, a detailed description of a modular pier system according to the invention is disclosed in detail in reference to the accompanying drawings. All examples herein should be seen as part of the general description and therefore possible to combine in any way or exchanged unless such combination or exchange is clearly contradictory to the overall function of the device.

Figure 1:
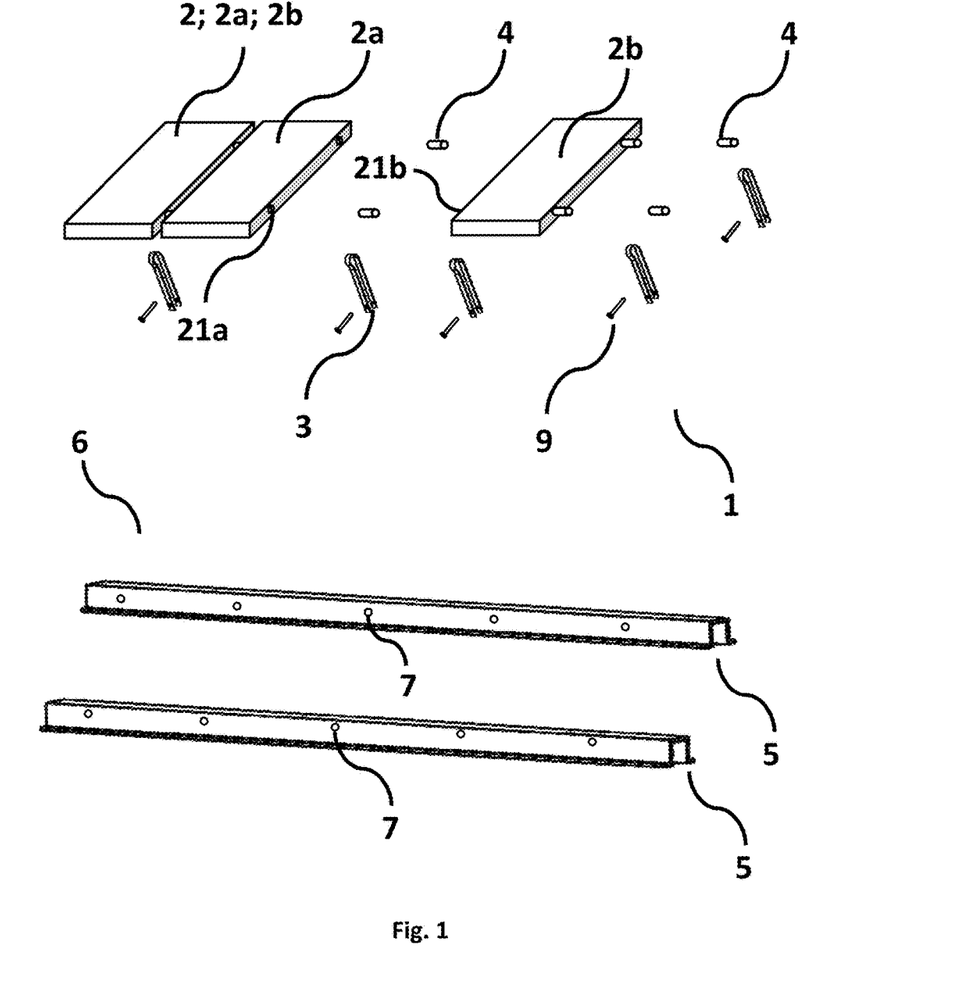
FIG. 1 discloses a modular pier system comprising the attachment system in an exploded view, FIG. 2a discloses a modular pier system in an assembled state, FIG. 2b discloses an attachment plug, FIG. 2c discloses an attachment bracket, FIG. 3 discloses a modular pier comprising vertical surface modules arranged on the side of the pier, FIG. 4 discloses an attachment system in a modular pier, wherein the attachment system comprises surface modules attached to the pier structure by means of the attachment system including the attachment bracket, FIG. 5a discloses an attachment bracket with an attachment plug, FIG. 5b discloses an attachment bracket with an attachment plug in a state wherein the attachment plug is broken off to release one or more surface modules, FIG. 6 discloses the internal structure of the surface modules, and FIG. 7 discloses attachment plugs in relation to the internal structure of the surface modules.

In FIG. 1 a modular pier system is shown comprising surface modules 2; 2a; 2b, attachment brackets 3, attachment plugs 4, attachment means 9, lower parts 6, and openings 7 adapted to receive the attachment means 9. The attachment system 1 is shown with its components, the surface modules 2; 2a; 2b, the attachment brackets 3, and the attachment plugs 4.

In FIG. 1 it is further shown, in an exploded view, how the attachment plugs 4 are adapted to be arranged in apertures 21a, 21b of the surface modules 2.

The lower parts 6 of the pier are in FIG. 1 illustrated as beams 5. The beams 5 have a hat profile. The hat profile of the beam 5 is open and not solid as can be seen from FIG. 1. The hat profile is well known to the person skilled in the art of metal forming but the hat profile is not commonly used for piers.

The hat profile of the beam 5 provides the advantage to the pier that there is less volume of material to be submerged in water at for example high-tide or during a storm. Less volume of material means less force lifting the pier according to Archimedes' principle.

It shall be noted that in another embodiment the pier has any other form of beams 5, such as I- or T-shaped beams, or solid wood beams.

Figure 2A:
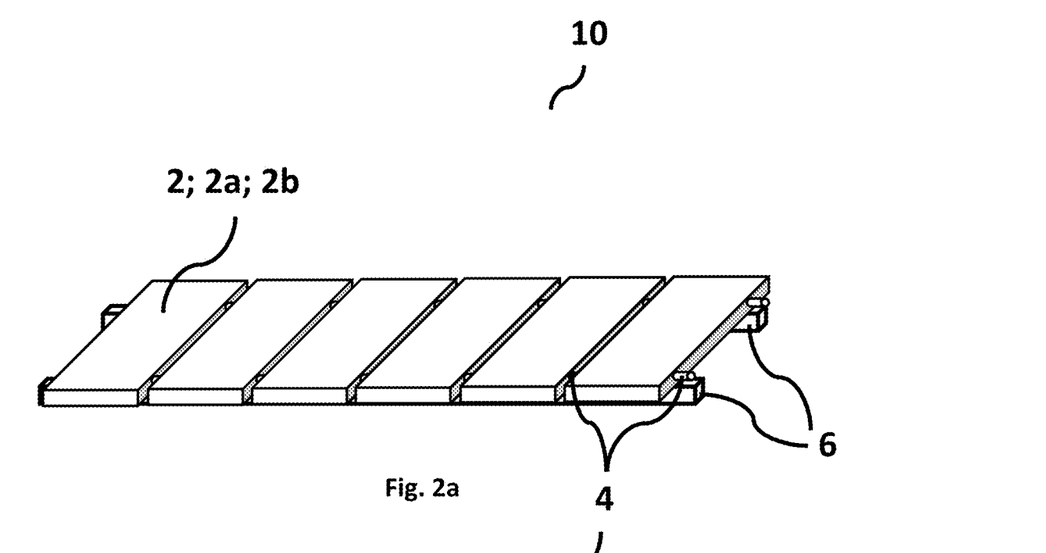

FIG. 2a discloses a pier 10 with a lower part 6 whereupon one or more of the surface modules 2 of the modular pier system are arranged. Preferably the modular pier system includes multiple surface modules 2 and multiple attachment systems 1 of the same type. Each of the surface module 2 is attached to one or more beams 5 which constitute the lower part 6 of the pier and which lower part 6 is anchored to the ground. The number of beams 5 are determined of the width and length of the assembled pier system. The surface modules 2; 2a; 2b are preferably attached perpendicular to the extension direction of the beams 5.

The attachment plug 4 is adapted to extend between an aperture 21a in a first surface module 2a and an aperture 21b in a second surface module 2b. The attachment bracket 3 is adapted to fasten the attachment plug 4 to a beam 5 of the lower part 6 of the pier and thereby fasten the surface modules 2 to the lower part of the pier 6. The apertures 21a, 21b are arranged on substantially vertical surfaces of the surface modules, which vertical surfaces face on to each other in an assembled state. The attachment plug 4 is made of for example wood. The attachment plug 4 is adapted to be the weakest link in the attachment system 1, this to facilitate and minimize the repair charges after for example a storm which sometimes removes the surface modules from the pier and destroys the pier. When repaired the pier, it is only the attachment plugs that need to be replaced. The surface modules floats and can easily be retrieved and fastened to the pier again.

Figure 2B:
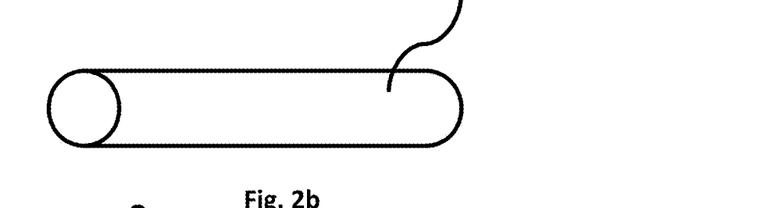

FIG. 2b illustrates an attachment plug 4. The attachment plug 4 as illustrated herein is round but it can have any geometrical shape or form.

Figure 2C:
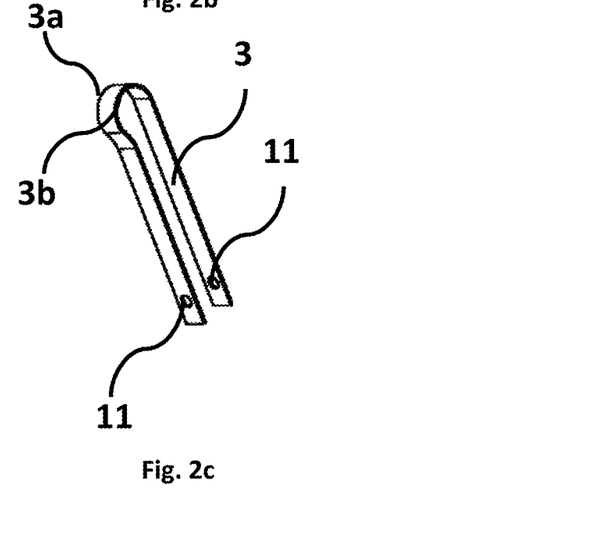

FIG. 2c illustrates an attachment bracket 3. The attachment bracket 3 is a bendable metal strip that is adapted to be fastened to the beam 5 or a lower part 6 of the pier 10. Further, the attachment bracket 3 is adapted to be folded around the attachment plug 4 and be attached to one of the beams 5 by means of an attachment means 9, the attachment means 9 can for example be a screw or bolt inserted in the opening 11 of the attachment bracket 3. The attachment bracket 3 has at least one sharp edge 3a, 3b in abutment with the attachment plug 4. The sharp edge 3a, 3b is adapted to facilitate a breakage line in the attachment plug 4 when a force that otherwise could harm the lower part 6 of the pier 10 or the surface modules 2 is exerted on the pier. During a storm the surface modules 2 are by water, wind, or ice forced to move and the attachment plug 4 is pushed against the sharp edge 3a, 3b and after a while if the force exceeds what the pier can withstand the attachment plug 4 breaks and disengage the surface module 2 partly or wholly from the beam 5.

Figure 3:
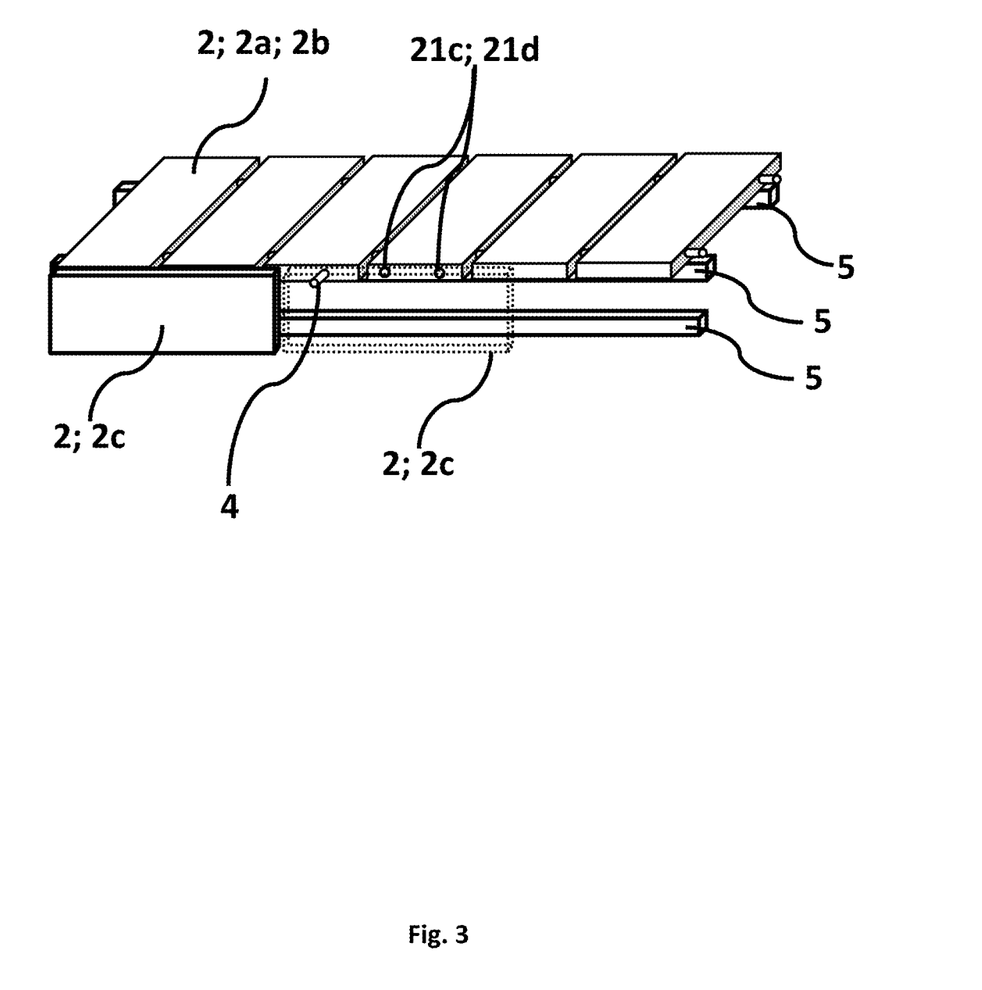

In FIG. 3 a pier with vertical surface modules is shown. The vertical surface modules 2c are arranged substantially perpendicular to a walking surface constituted of for example a first and second surface module 2a, 2b. In one embodiment the first and second surface modules 2a, 2b has side apertures 21c, 21d allowing for a vertical surface module 2c to be attached to the pier 10.

FIG. 3 further illustrates an embodiment wherein multiple beams 5 are arranged as the lower part 6 of the pier 10.

Figure 4:
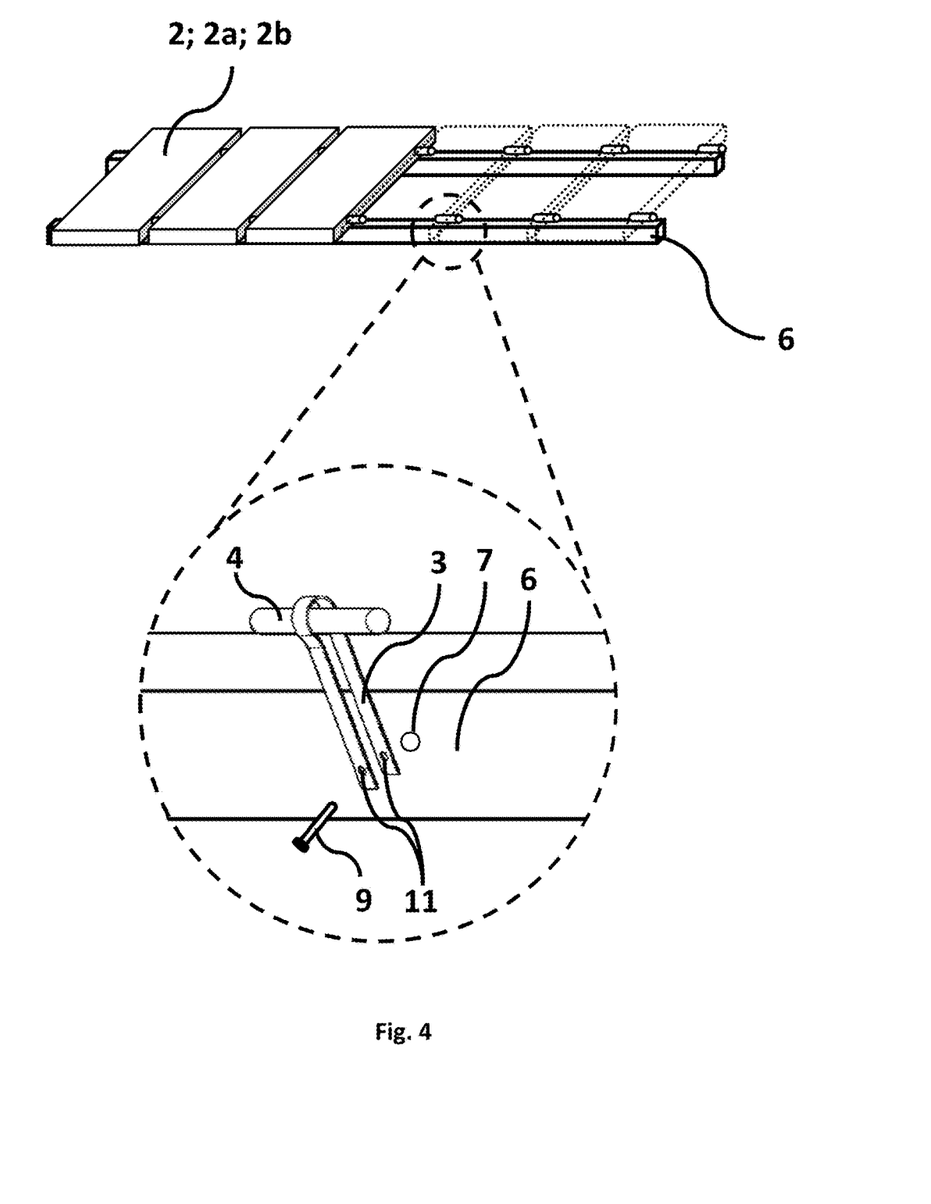

FIG. 4 illustrates a magnified view of part of the attachment system 1. The attachment bracket 3 is adapted to be attached to a lower part 6 of the pier, such as a beam 5, via an attachment means 9. The attachment means 9 is in one embodiment holding the attachment bracket 3 through arraigning said attachment means 9 thoroughgoing the opening 11 in the attachment bracket 3 and securing the attachment bracket to the lower part 6 by means of an opening 7 in the lower part 6 of the pier 10.

Figure 5A:
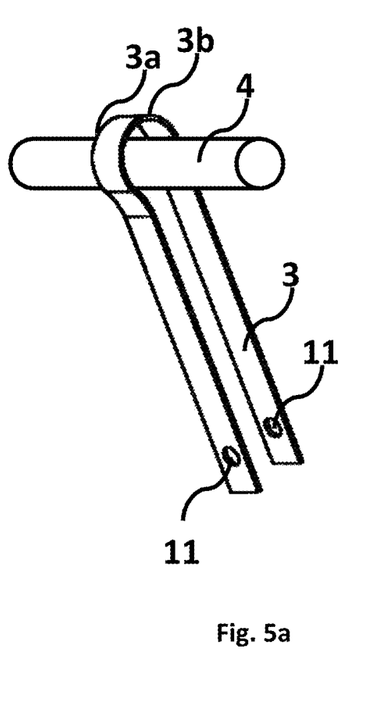

FIG. 5a illustrates an attachment bracket 3 with an attachment plug 4. The attachment plug 4 is, in one embodiment when the attachment bracket 3 is secured to the pier 10, in abutment with at least one sharp edge 3a, 3b of the attachment bracket. The sharp edge 3a, 3b facilitates a breaking point in the attachment plug 4 enabling that the attachment plug 4 can be made stronger meanwhile still being the weakest component, and thereby the component breaking first, in the attachment system 1.

Figure 5B:
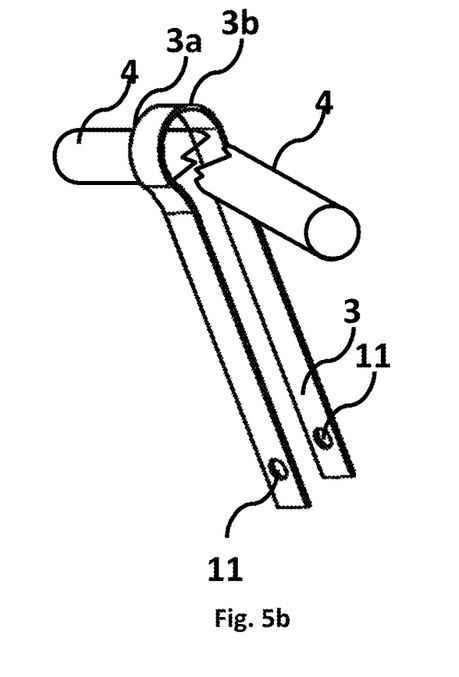

FIG. 5b illustrates what happens when the force on the attachment plug 4 goes beyond what it is intended to withstand. The attachment plug 4 breaks and thereby releases the surface modules 2; 2a; 2b from the pier 10. Thereby the surface modules 2; 2a; 2b are released without being damaged and can easily be refitted to the pier 10 by just replacing the attachment plug 4.

Figure 6:
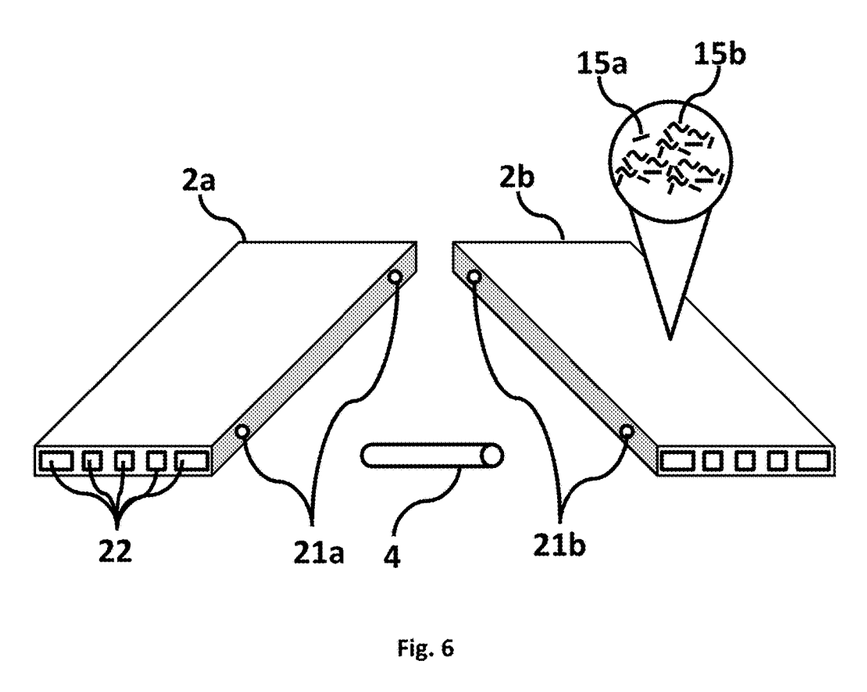

In FIG. 6 the surface modules 2a, 2b are elongated self-supporting surface modules. The surface modules 2a, 2b are produced from a composite material 15a, 15b. The self-supporting surface modules 2a, 2b are constituted of at least a first 15a and second 15b material. The first 15a and second 15b material being different materials having equal or substantially equal coefficients of elasticity.

The surface modules 2a, 2b may be solid or comprise cavities within the interior of the surface modules 2a, 2b. The surface modules 2a, 2b shown in FIG. 6 comprises internal cavities 22. The advantage with internal cavities 22 within the surface modules 2a, 2b is that when the water is lapping against the pier during a storm, the buoyancy of the surface modules 2 with internal cavities 22 are smaller than for solid surface modules due to less material and hence lower buoyancy.

The attachment system 1 is used to assemble a pier 10, within which the beam 5 of the lower part 6 of the pier 10 has a hat channel profile. The pier 10 further comprises at least one vertical surface module 2c arranged as an end of the pier 10. The hat channel profiles further reduce the amount of material in the water meaning less material under water in case of a storm or high-tide.

The pier 10 is built by means of an attachment system 1 for attaching a surface material to a pier 10, wherein the attachment system 1 comprises an attachment bracket 3 and an attachment plug 4. The pier 10 is built by arranging a first surface module 2a on a beam 5 of a pier structure, and placing an attachment plug 3 in an aperture 21a of said first surface module 2a on a surface facing the direction wherein a second surface module 2b is to be arranged. The attachment plug 3 is fastened with an attachment bracket 4 to the beam 5 of lower parts 6 of the pier 10, and a further second surface module 2b is arranged on the beam 5 of the lower parts 6. The second surface module 2b is slid into engagement between the attachment plug 3 and an aperture 21b of the second surface module 2b, which aperture 21b is corresponding to the aperture 21a of the first surface module 2a.

Figure 7:
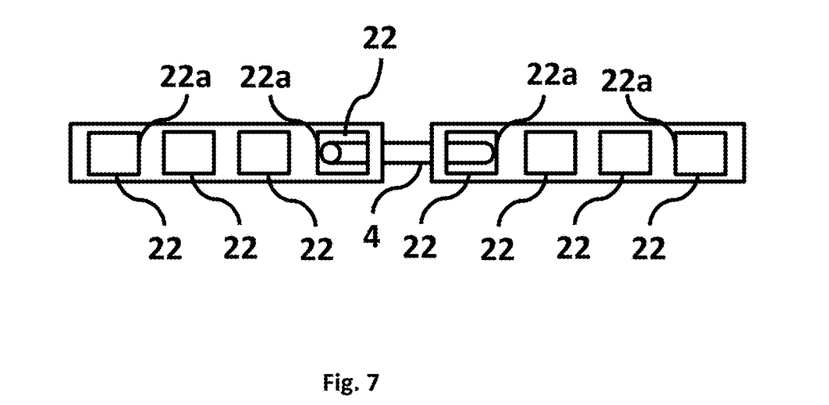

FIG. 7 illustrates how the length of the attachment plug 4 enables that the distance between a first 2a and second 2b surface module can be kept constant. The attachment plug 4 has a specific length that allows it to abut a wall 22a of the internal cavities 22 and thereby determining the distance between two surface modules 2. This makes the pier 10 easier to assemble and the end result is a pier 10 with exactly the same distance between each surface module 2.

In one embodiment the vertical surface module 2c is instead arranged with any other form of attachment means, such as traditional screws or nails.

After a storm has given rise to high waves and devastated the pier 10 by detaching the surface modules from the pier 10, the only parts that need to be replaced are the attachment plugs 4. The reason or this is that the attachment plugs 4 are the weakest parts within the pier 10 and the attachment systems 1. The attachment plugs 4 will therefore break off before any other part is harmed. The advantage with this is that the attachment plugs 4 are also the least expensive parts within the pier construction, and thus also inexpensive to replace.

Figure 8A:
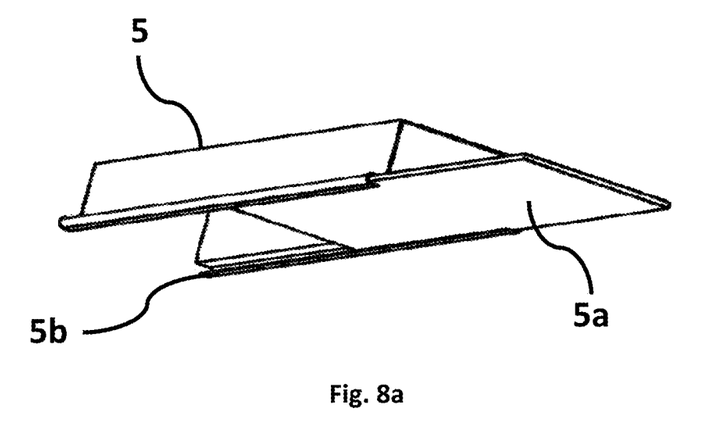
FIG. 8a discloses a beam with a stabilization plate during assembling.

FIG. 8a illustrates another embodiment of the beam 5 wherein the beam 5 comprises a lower stabilization plate 5a that is adapted to be arranged together with a hat profile of a beam 5 to enable that a beam 5 can withstand more load. One advantage with the embodiment as illustrated in FIG. 8a is that the beam 5 can be made of thinner material.

FIG. 8a further illustrates how the stabilization plate 5a in one embodiment can be inserted into slots 5b of the beam 5.

Figure 8B:
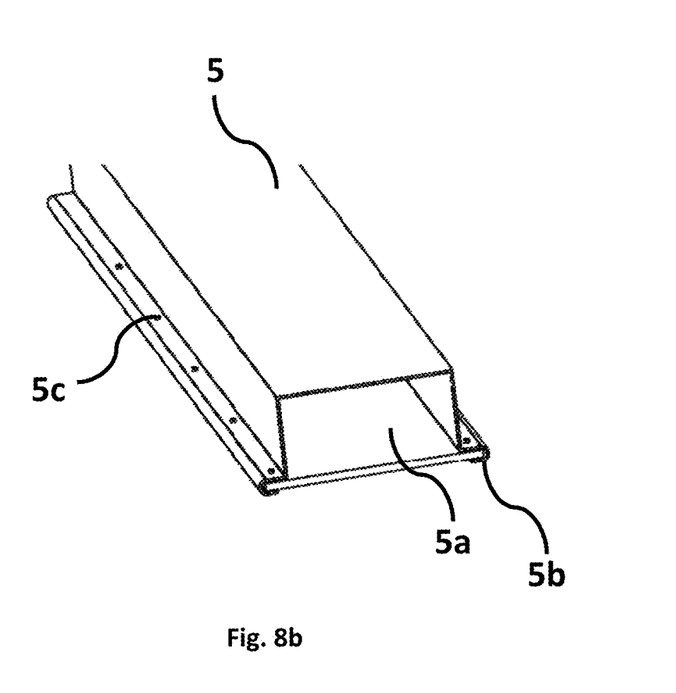
FIG. 8b discloses a beam with a stabilization plate in an assembled state.

FIG. 8b illustrates a stabilization plate 5a in its assembled position with the beam 5. The stabilization plate 5a can as shown in FIG. 7b be held in place either by slots 5b, attachment elements 5c, or any combination thereof. Attachment elements 5c can for example be rivets, nails, screws, or any other form.

The invention claimed is:

1. An attachment system for attaching surface modules of a pier to a lower part of the pier, wherein the attachment system comprises an attachment bracket, an attachment plug, a first surface module and a second surface module, wherein the attachment plug is adapted to extend between an aperture in the first surface module and an aperture in the second surface module, and in that said attachment bracket is adapted to be fastened to the lower part of the pier, and the attachment bracket is to be fastened to the attachment plug so that the attachment plug is fastened to the lower part of the pier and thereby the first and the second surface modules are fastened to the lower part of the pier, and wherein the attachment bracket has at least one edge adapted to break the attachment plug at a pre-determined breakage line on movement of the first or second surface module relative to the attachment bracket.

2. The attachment system according to claim 1, wherein the attachment plug is made of wood.

3. The attachment system according to claim 1, wherein the attachment plug is weaker than the attachment bracket and the first and second surface module such that on relative movement of the first or second surface modules to the attachment bracket, the attachment plug will break prior the attachment bracket or the first or second surface modules.

4. The attachment system according to claim 1, wherein the attachment bracket has a first loop-shaped end in which the attachment plug is adapted to be inserted and a second end adapted to be attached to the lower part of the pier.

5. The attachment system according to claim 1, wherein the first and the second surface modules are elongated self-supporting surface modules produced from a composite material.

6. The attachment system according to claim 5, wherein each of the first and the second self-supporting surface modules comprises at least a first and second material, the first and second material being different materials having equal or substantially equal coefficients of elasticity.

7. The attachment system according to claim 1, wherein the lower part of the pier is at least one beam.

8. The attachment system according to claim 7, wherein the attachment bracket is a bendable metal strip that is adapted to be fastened to the at least one beam of the lower part of the pier.

9. The attachment system according to claim 1, wherein the at least one beam has a hat channel profile.

10. The attachment system according to claim 1, wherein the surface modules has at least one channel and the attachment plug has a length corresponding to more than twice of a width of the at least one channel.

11. A pier comprising a lower part and at least one attachment system according to claim 1.

12. The pier according to claim 11, wherein the pier further comprises at least one vertical surface module arranged at a first side of the first and the second surface modules.

13. A method for building a pier, comprising an attachment system and a lower part, wherein the attachment system comprises an attachment bracket, an attachment plug, a first surface module and a second surface module, wherein the attachment bracket has at least one edge adapted to break the attachment plug at a pre-determined breakage line on movement of the first or second surface module relative to the attachment bracket, wherein the method comprises the steps:
- arranging the first surface module on the lower part,
- inserting a first end of the attachment plug in an aperture of said first surface module on a side of the first surface module that is to face the second surface module,
- inserting said attachment plug into the attachment bracket, which attachment bracket is fastened to the lower part of the pier,
- arranging a second surface module on the lower part, and
- inserting a second end of said attachment plug into an aperture of the second surface module facing the aperture of the first surface module.

14. The method for building a pier according to claim 13, wherein the method further comprises the step:
- placing a first end of at least one attachment plug in a side aperture of said first or second surface module, wherein the side apertures are arranged on a side of the first or second surface module facing an end of the pier, and
- arranging a vertical surface module on the side of the first or second module by engaging a second end of said at least one attachment plug to an aperture in said vertical surface module.

* * * * *